United States Patent [19]
Day

[11] Patent Number: 4,880,189
[45] Date of Patent: Nov. 14, 1989

[54] DEVICE FOR CLOSING AND OPENING IN THE LEADING EDGE OF A WING

[75] Inventor: Roger A. Day, Bristol, England

[73] Assignee: British Aerospace Public Limited Company, London, England

[21] Appl. No.: 190,017

[22] Filed: Sep. 4, 1988

[30] Foreign Application Priority Data

May 6, 1987 [GB] United Kingdom ................ 8710735

[51] Int. Cl.4 .............................................. B64C 3/50
[52] U.S. Cl. .................................... 244/214; 244/130
[58] Field of Search ............................ 244/213–216, 244/211, 130; 89/37.19, 37.21, 1.817

[56] References Cited

U.S. PATENT DOCUMENTS

| | | | |
|---|---|---|---|
| 4,042,191 | 8/1977 | Johnson | 244/214 |
| 4,131,252 | 12/1978 | Dean et al. | 244/215 |
| 4,360,176 | 11/1982 | Brown | 244/214 |
| 4,640,477 | 2/1987 | Pace | 244/214 |
| 4,753,402 | 6/1988 | Cole | 244/214 |

Primary Examiner—Joseph F. Peters, Jr.
Assistant Examiner—Anne Sartelle
Attorney, Agent, or Firm—Cushman, Darby & Cushman

[57] ABSTRACT

A shutter arrangement for closing an aperture formed in the fixed leading edge of an aircraft wing when a track supported slat moves from a stowed, cruise configuration in which it lies adjacent the fixed wing portion to a high light configuration in which it is spaced from the wing to define a slot. The aperture, which exist to accommodate the slat to track attachment 'knuckles', may induce undesirable flow disturbance in the slot formed between the slat and the fixed leading edge. The present invention provides a hinged retractable shutter for closing off the aperture when the slat is deployed. In the preferred arrangement the shutter is of multi-panelled hinged configuration and, in one described arrangement is of one-piece moulded composite rubber construction.

3 Claims, 4 Drawing Sheets

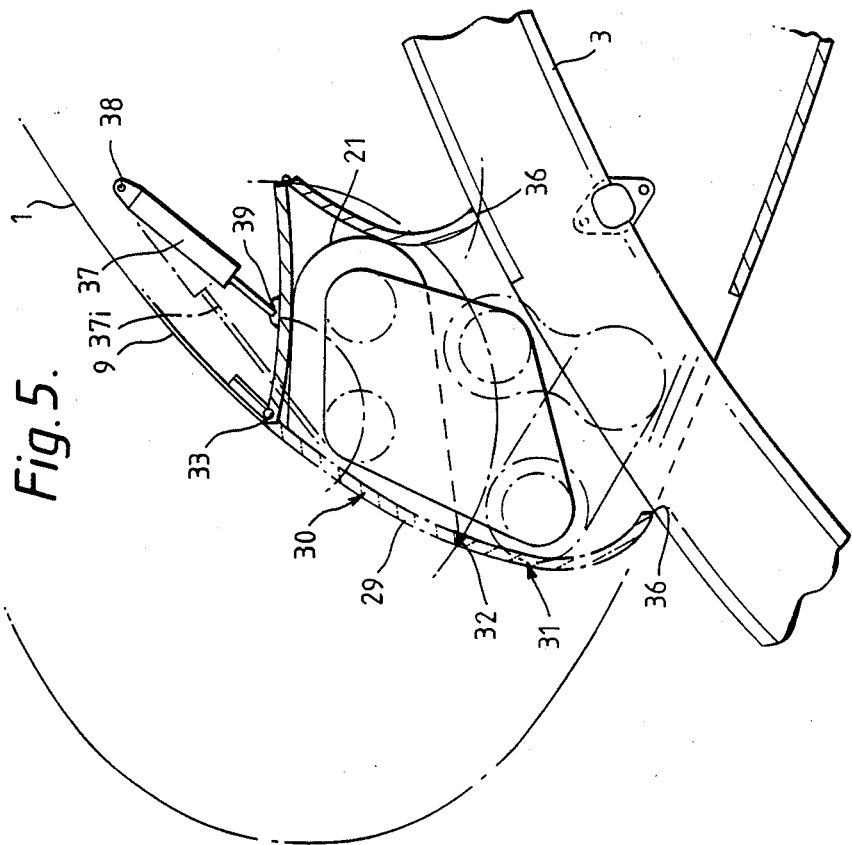
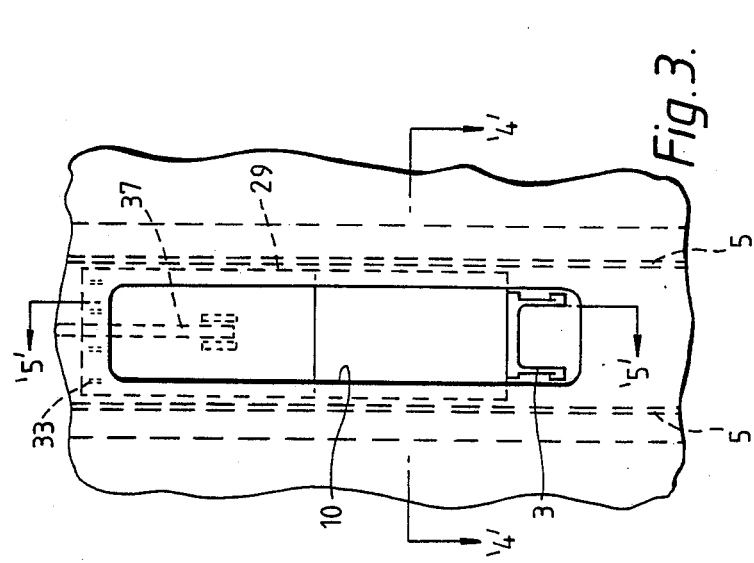
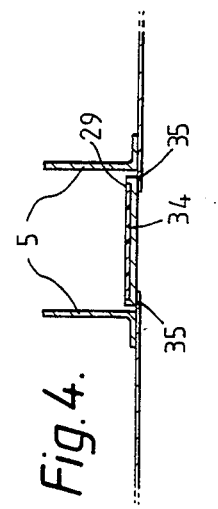

DEVICE FOR CLOSING AND OPENING IN THE LEADING EDGE OF A WING

This invention relates to leading edge arrangements for aircraft in which a slat is provided forwardly of a fixed wing portion and is movable between a cruise configuration in which it lies adjacent the fixed wing portion and a high left configuration in which it is spaced from the wing to define a slot.

Various arrangements are known for supporting the slat and controlling its attitude over its operating range of movement. These generally comprise support tracks secured to the slat at or about their forward extremities and which are slidably mounted with respect to the fixed wing portion. They may be of circular arc form such that the path followed by the slat is by definition a circular arc or alternatively, they may be configured such that the slat can adopt optimized attitudes at selected angles of deployment in accordance with specific flight modes, eg, cruise, take-off and landing. In any event, each spanwise section of slat is supported on two or more support tracks generally by means of a structural bolted attachment extending as a 'knuckle' from the rearward face of the slat. This 'knuckle' may further include slat adjustment means whereby the slat may be properly rigged to ensure that it achieves a smooth upper surface continuity with the fixed when in its stowed position.

In its stowed position, the trailing surface region of the slat which is of generally concave form lies in close proximity to the fixed wing leading edge portion of generally convex form and this fixed wing leading edge portion must be apertured to accommodate not only the support track but also the knuckle assembly. This may result in a significantly sized aperture which is an undesirable feature when the slat is deployed since it may induce undesirable flow disturbance in the slot formed between the slat and the fixed leading edge portion.

U.S. Pat. No. 4,640,477 teaches an improvement to close an opening formed in the leading edge of an airfoil when a slat is moved to its deployed position and comprises a door which is mounted about an axis of rotation that is positioned in a vertical plane generally parallel to the movement of the slat supporting track. The axis of rotation of the door is slanted so that the door moves upwardly, rearwardly and laterally to its retracted position so as to permit the track to be retracted and when the track is extended, a spring moves the door into its deployed position to close the opening.

According to the present invention there is provided a wing leading edge arrangement for aircraft in which a slat is provided forwardly of a fixed leading edge portion and movable between a stowed configuration in which it lies closely adjacent the fixed leading edge portion and a deployed configuration in which it is spaced from the wing to define a slot, said arrangement including;

slat attachment means for connecting said slat to two or more support tracks slidably mounted with respect to the fixed wing portion to define said movement;

aperture means in said fixed leading edge portion to accommodate said slat attachment means when said slat is in its stowed configuration;

aperture closing means pivotally located to said fixed leading edge portion adjacent said aperture and movable between a folded position when the slat is in its stowed configuration and an aperture closing position when said slat is in its deplayed configuration;

and actuating means interconnecting said aperture closing means and said fixed leading edge portion for causing said aperture closing means to move between its stowed and deployed positions;

said aperture closing means comprising a shutter whose surface area is at least equivalent to the included area of said aperture and configured such that when closed it conforms substantially to the inner surface configuration of said fixed leading edge portion and hinge means transversely connecting said shutter at or adjacent its upper boundary to said fixed leading edge portion such that it is constrained to move from its stowed to deployed positions in a plane generally parallel to the movement of its associated slat supporting track.

Preferably, said shutter comprises a first panel portion having along one edge hinge means for locating said first panel to said fixed leading edge portion adjacent said aperture and further hinge assembly along an opposing edge for engaging a second panel portion, said first and second panel portions in combination arranged to close off said aperture or to fold for stowage within said wing leading edge portion when the slat assumes its stowed configuration.

Preferably said shutter is of composite rubber construction and includes uni-directional silicon inserts to increase lateral stiffness.

Preferably said first and second panel portions and said interconnecting hinge means are of one-piece moulded construction and said first and second panel means include uni-directional silicon inserts for increased lateral stiffness.

One embodiment of the invention will now be described, by way of example, with reference to the following drawings in which:

FIG. 3 illustrates the structural arrangement of the wing fixed leading edge portion in the direction of arrow 3 in FIG. 1.

FIG. 4 illustrates a section through the wing leading edge portion along a line '4—4' in FIG. 3.

FIG. 5 illustrates a sectional side view on the aperture closure panel arrangement looking along a line 5—5 in FIG. 3.

Figure 1:
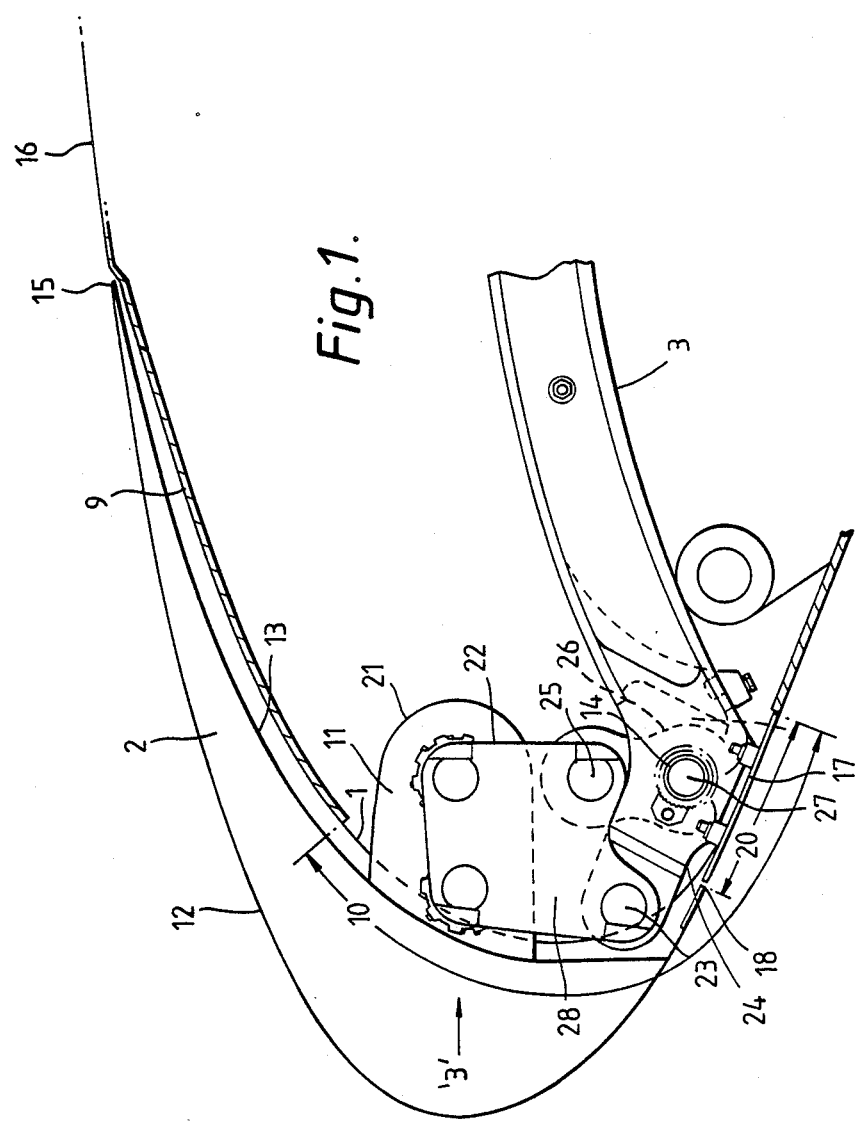
FIG. 1 illustrates an aircraft wing leading edge illustrating a slat in stowed configuration.
Figure 2:
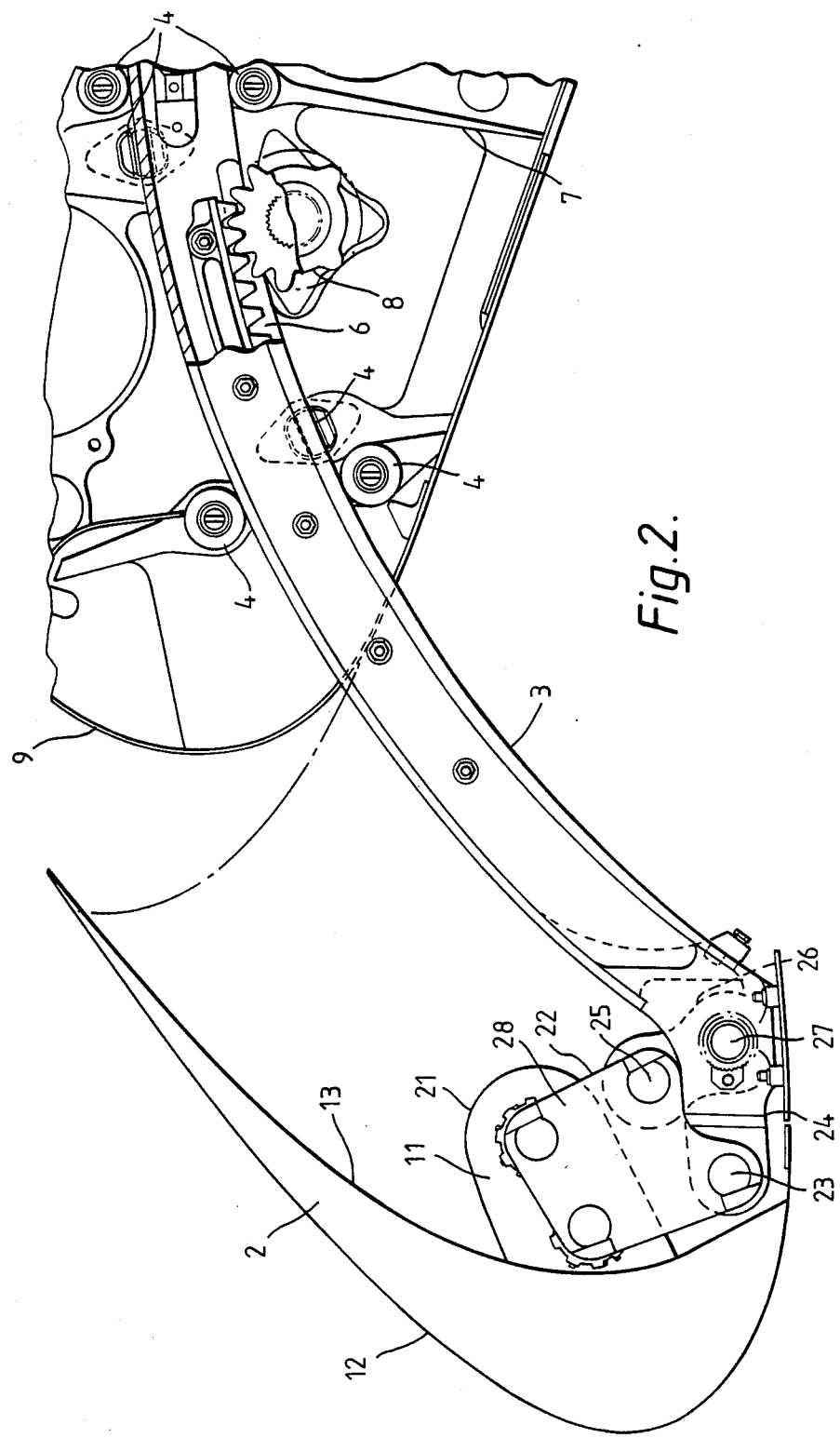
FIG. 2 illustrates, in greater detail, the same wing leading edge arrangement with a slat in deployed configuration.

Referring to the drawings, FIGS. 1 and 2 illustrate a wing leading edge arrangement including a fixed wing leading edge portion 1 and a slat 2 mounted upon an arcuate track 3 which is slidably mounted with respect to the fixed wing portion 1 on a series of rollers 4 rotatably mounted upon two leading edge diaphragms 5 between which the track moves as illustrated in FIG. 3. The rollers are omitted for clarity in this view. FIG. 2 further illustrates a geared rack 6 on the track 3 engaging a pinion 7 mounted upon a rotary actuator 8 by which means the slat 2 is moved from its stowed, datum cruise position as shown in FIG. 1 to the fully deployed landing setting as shown in FIG. 2. The fixed wing leading edge portion 1 further includes a leading edge skin portion 9 having an elongated aperture 10 symmetrically disposed between the leading edge diaphragms 5, the length of the aperture designed to accommodate the track 3 and the track to slat attachment 'knuckle' 11.

The slat 2 includes a leading edge outer profile 12 conforming to the basic aerofoil and a concave trailing edge portion 13 which conforms substantially to the fixed wing leading edge portion 1. The slat 2 is arranged and includes adjustment means 14 such that the upper trailing edge 15 in stowed configuration maintains a smoothly contoured interface with the wing upper surface profile 16. A closing plate 17 mounted off the forward extremity of the track 3 bridges the gap 20 between the slat lower trailing 18 and the bottom edge of the aperture 10 when the slat is in stowed position.

The slat 2 is located to the track 3 as illustrated in FIG. 2. A lug 21 extends rearwardly from the slat to which are mounted, one to each side, adjuster plates 22 having a lower forward pivotal attachment 23 to a cranked extension 24 of the track 3 and a rearward pivotal attachment 25 engaging a downwardly extending swinging link 26 having a lower pivotally attachment 27 to the track 3. The assembly comprises both a slat attachment and a slat adjusting arrangement 14, not described in detail here but for the purposes of the description of this embodiment will hereinafter be described as 'knuckle' joint 28. Referring now to FIGS. 3, 4 and 5, the fixed wing leading edge portion 1 includes an aperture closure panel 29 for closing off, when the slat 2 is deployed, that portion of the aperture 10 which extends above the track 3. As illustrated in FIG. 5 this closure panel 29 is configured such that its profile in side elevation conforms to the corresponding profile of the wing leading edge portion 1. It comprises an upper panel portion 30 and a lower panel portion 31 hinged together about a substantially horizontal hinge axis 32 and this closure panel assembly 29 is hingedly attached at its upper boundary 33 to the aperture 10, which it overlaps along its sides and lower edges to provide a seating. The closure panel in this arrangement is a one piece rubber composite moulding arranged such that the hingeable intersection between the respective upper and lower panel portions 30 and 31 is an integral part of the moulding, ie, there is no separate mechanical 'piano-type' hinge although separate mechanical hinges of this type between the respective parts and the aperture may be employed. Similarly, the panel portions may be of metal or of some other composite material such as fibre-reinforced plastic. In this present and preferred embodiment the panel is, as previously stated, of rubber composite moulding and includes within it silicon inserts 34 to increase lateral stiffness and along the outer abuttment edge 35 a metal interface between the panels and the inner surface of the leading edge skin surface.

FIG. 5 additionally illustrates the closure panel 29 in its in-operative condition, the sequence for achieving this panel movement to be later described. The panel 29 adopts an inverse curvature attitude with the lower edge 36 seated upon the upper surface of the track 3. The closure panel assembly is connected to a spring strut 37 pivotally connected at 38 to the fixed leading edge structure and pivotally connected at 39 to the inner surface of the upper panel 31. This is a compression strut which applies a closing force on the closure panel 29 as the slat deploys and additionally maintains a restraining force on the panel when in its aperture closing position to react resultant forces arising from the airflow through the slot formed by the slat and the fixed leading edge structure. The strut in this position is indicated in broken line (37i). In this arrangement, with the slat in its stowed position the respective panel portions 30 and 31 lie in abutment with the lug 21 and, in conjunction with the strut load applied on the rearward face, the panel is restrained against movement.

Figure 6:
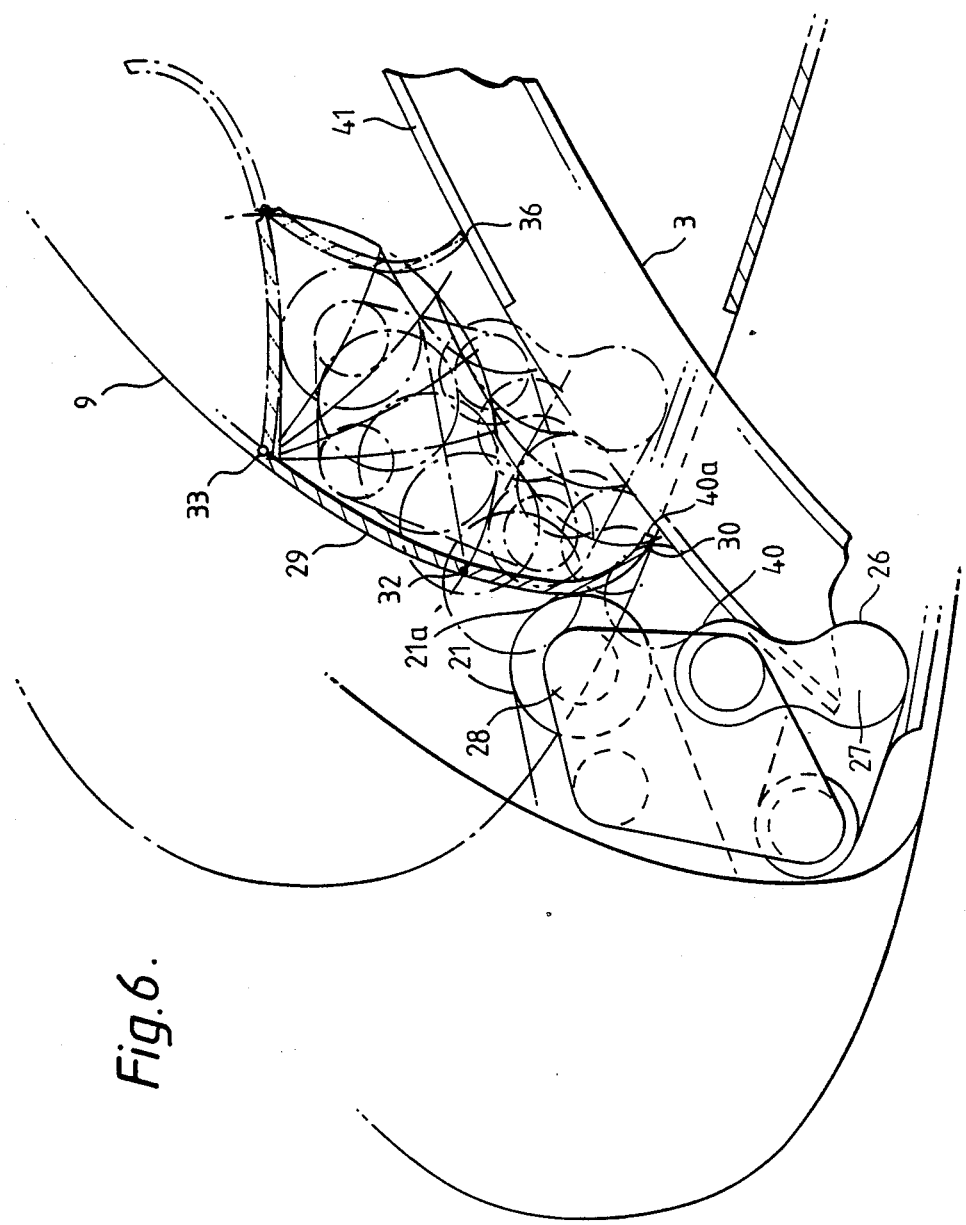
FIG. 6 illustrates geometrically the operational sequence of the closure panel deployment.

FIG. 6 illustrates diagrmmatically the operational sequence for the closure panel 29 in conjunction with slat movement from its deployed to stowed position. The closure panel movement is controlled and driven by mechanical interaction between the 'knuckle' 28 and the closure panel 29, in particular by means of contact either between the lug 21 and the lower panel portion 31 or between the lug portion 40 of the swinging link 26 and the same panel portion at different stages in the sequence.

For example, on initial slat retracting movements the lug 21 will contact the lower panel portion 31 at point 21a initiating a differential folding of that panel with respect to the upper panel portion 30 about the horizontal hinge axis 32, the upper panel 30 simultaneously hinging about the upper boundary 33. The higher contact point on the closure panel at this stage in the sequence will initially assist rotation of the closure panel against the spring force of the spring strut 37, (omitted in this view for clarity).

Folding of the respective panel portions continues during the slat closure sequence until the lower panel 31 has adopted a flattened attitude such that the lug 21 intersection with the panel is no longer effective by which stage the lug portion 40 on the swinging link 26 engaging the lower panel portion 31 effects further folding action of the closure panel assembly 29 until it assumes its fully folded configuration simultaneously with full slat closure. It should be noted that whilst the lower edge 36 of the lower panel portion 31 is effectively in sliding contact with the upper surface 41 of the track 3 any 'scuffing' arising as a result of this contact during slat closure or deployment will be minimised as a result of simultaneous movement of the track 3 and the closure member.

In the reverse sequence of operation, deployment of the slat initiates simultaneous deployment of the closure panel under the influence of the spring strut 37 until the closure panel is effectively in closing engagement with the fixed leading edge portion thus obviating undesirable flow disturbing in the slot.

The deployment means of this invention may be further adapted by replacing the spring strut 37 of the present embodiment with a torsion spring incorporated into a piano-type hinge providing the horizontal hinge axis at the upper boundary 33.

I claim:

1. A wing leading edge arrangement for aircraft in which a slat is provided forwardly of a fixed leading edge portion and movable between a stowed configuration in which it lies closely adjacent the fixed leading edge portion and a deployed configuration in which it is spaced from the wing to define a slot, said arrangement including:

slat attachment means for connecting said slat to two or more support tracks slidably mounted with respect to the fixed wing portion to define said movement;

aperture means in said fixed leading edge portion to accommodate said slat attachment means when said slat is in its stowed configuration;

aperture closing means pivotally located to said fixed leading edge portion adjacent said aperture and movable between a folded position when the slat is in its stowed configuration and an aperture closing position when said slat is in its deployed configuration;

and actuating means interconnecting said aperture closing means and said fixed leading edge portion for causing said aperture closing means to move between its stowed and deployed positions;

said aperture closing means comprising a shutter whose surface area is at least equivalent to the included area of said aperture and configured such that when closed it conforms substantially to the inner surface configuration of said fixed leading edge portion and hinge means transversely connecting said shutter at or adjacent its upper boundary to said fixed leading edge portion such that it is constrained to move from its stowed to deployed positions in a plane generally parallel to the movement of its associated slat supporting track;

said shutter comprising a first panel portion including first hinge means for hingedly connecting said first panel portion at or adjacent its upper boundary to said fixed leading edge portion and second hinge means positions adjacent its lower boundary for hingedly engaging a second panel portion, said first and second panel portions combining to close off said aperture when the slat is deployed but which are foldable with respect to each other when the slat assumes its stored configuration.

2. Aperture closing means according to claim 1 in which the construction is of composite rubber and includes uni-directional silicon inserts.

3. A shutter arrangement according to claim 1 in which first and second panel portions and said interconnecting hinge means are of one piece moulded rubber construction and said first and second panel means include uni-directional silicon inserts.

* * * * *